United States Patent [19]

Whitlock

[11] Patent Number: 5,733,452

[45] Date of Patent: Mar. 31, 1998

[54] FILTER AND END CAP ASSEMBLY INCLUDING A POROUS LAYER FOR SEALING WITH A POTTING MATERIAL AND METHOD FOR MAKING THE ASSEMBLY

[75] Inventor: Michael B. Whitlock, Cortland, N.Y.

[73] Assignee: Pall Corporation, East Hills, N.Y.

[21] Appl. No.: 426,076

[22] Filed: Apr. 21, 1995

[51] Int. Cl.⁶ .................. B01D 27/06; B01D 27/08
[52] U.S. Cl. .................. 210/497.01; 210/497.2; 210/493.2; 55/502; 55/510; 55/523; 156/69; 156/73.5; 156/82; 156/89; 428/446
[58] Field of Search .................. 428/446; 156/69, 156/73.5, 82, 89; 210/493.2, 496, 450, 497.01, 497.2, 483, 455; 55/502, 510, 523

[56] References Cited

U.S. PATENT DOCUMENTS

| | | | |
|---|---|---|---|
| 2,082,513 | 6/1937 | Roberts | 210/76 |
| 2,297,817 | 10/1942 | Truxell, Jr. et al. | 210/496 |
| 2,957,235 | 10/1960 | Steinberg | 29/424 |
| 3,061,917 | 11/1962 | Pall | 29/401 |
| 3,394,445 | 7/1968 | Valyi | 29/157 |
| 3,501,013 | 3/1970 | Madsen | 210/496 |
| 3,556,304 | 1/1971 | Collard et al. | 210/489 |
| 3,980,565 | 9/1976 | Fowler | 210/489 |
| 4,082,071 | 4/1978 | Jones | 123/119 |
| 4,613,369 | 9/1986 | Koehler | 75/246 |
| 4,740,252 | 4/1988 | Hasegawa et al. | 148/24 |
| 4,822,692 | 4/1989 | Koehler | 428/547 |
| 4,828,930 | 5/1989 | Koehler | 428/547 |
| 4,932,582 | 6/1990 | Une | 228/122 |
| 4,983,423 | 1/1991 | Goldsmith | 427/230 |
| 5,106,483 | 4/1992 | Kitano | 205/148 |
| 5,149,360 | 9/1992 | Koehler et al. | 75/228 |
| 5,198,007 | 3/1993 | Moyer et al. | 210/510.1 |
| 5,395,039 | 3/1995 | Koehler et al. | 228/248 |

FOREIGN PATENT DOCUMENTS

| | | |
|---|---|---|
| 2087773 | 7/1993 | Canada . |
| 0057848 | 8/1982 | European Pat. Off. . |
| 0553637 | 8/1993 | European Pat. Off. . |
| 0561001 | 9/1993 | European Pat. Off. . |
| 2255933 | 7/1975 | France . |
| 63-259063 | 10/1988 | Japan . |
| 2152399 | 8/1985 | United Kingdom . |
| 2176500 | 12/1986 | United Kingdom . |
| 9013393 | 11/1909 | WIPO . |

OTHER PUBLICATIONS

Research Disclosure, Dec. 1991, No. 332, "Refractory Metal Powder Filled Braze" (32242).
Partial EPO Search Report for 96302649.7, Dec. 1996.

*Primary Examiner*—W. L. Walker
*Attorney, Agent, or Firm*—Leydig, Voit & Mayer, Ltd.

[57] ABSTRACT

A filter assembly is formed by fixing a porous layer to an end cap and sealing the end cap to a filter pack with a potting material. The potting material flows down, around and under the porous layer resulting in a robust mechanical seal upon curing.

49 Claims, 1 Drawing Sheet

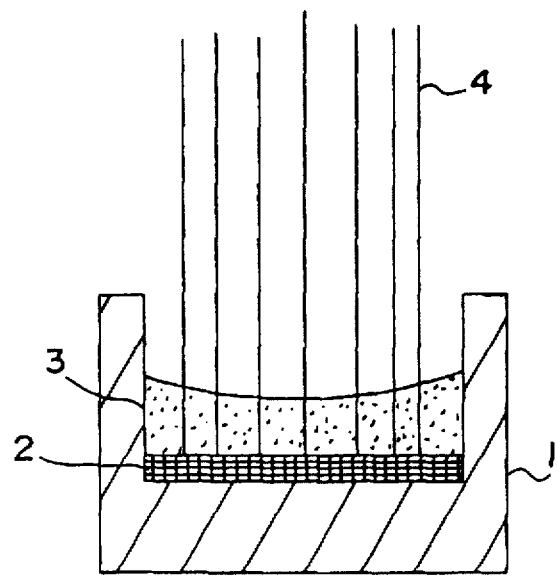
F I G. 1
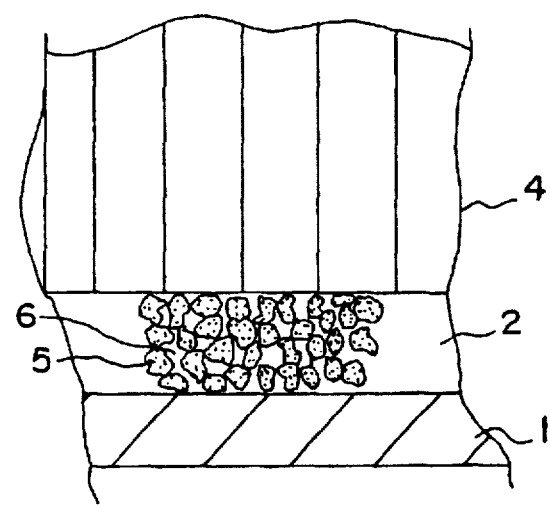
F I G. 2

FILTER AND END CAP ASSEMBLY INCLUDING A POROUS LAYER FOR SEALING WITH A POTTING MATERIAL AND METHOD FOR MAKING THE ASSEMBLY

FIELD OF THE INVENTION

This invention is directed to a filter assembly and a method of making a filter assembly. More particularly, this invention relates to a method of sealing an end cap to a filter pack to form a filter assembly.

BACKGROUND OF THE INVENTION

End caps prevent bypass of a fluid around a filter pack. As used herein, the term "filter pack" refers to any structure that includes a filter medium. The filter medium may be, but is not limited to, a metal mesh or porous metal medium formed from metal powder or metal fibers; a ceramic mesh or porous ceramic medium formed from ceramic powder or fibers; or a polymeric non woven web or porous sheet medium formed from polymeric fibers or polymeric membrane.

End caps are bonded to a filter pack so as to form a filter assembly having fluid tight seals. Typically, end caps are bonded to a filter pack by means of chemical adhesives or potting compounds, welding, or fusion. A variety of materials such as polymers and metals are generally used in the composition of end caps. In addition, ceramics may be used as end cap material.

Polymeric end caps are preferred in applications which involve non-corrosive fluids, and ambient to moderately high temperatures. Polymeric end caps are easy to produce and economical, and traditional means of bonding polymeric end caps to a filter pack are well known. However, polymeric end caps may be unsuitable in high temperature applications. In those applications where polymeric end caps are not suitable, e.g., high temperature applications, and corrosive fluids, metal end caps are preferred.

Metal end caps are typically bonded to a filter pack by welding or by chemical adhesives or potting compounds, however, welding is not practical where the filter pack comprises a polymer and the end cap comprises a metal or ceramic. One of the problems encountered with welding is that it is difficult to make a weld without compressing or densifying the medium. In deep or open pleat filter pack design, this is difficult to accomplish without damaging the medium. Welding may also be uneconomical for small batches. Furthermore, it may be desirable to use polymeric or ceramic medium with metal endcaps. An alternative to welding in such instances is the use of chemical adhesives or potting compounds.

Traditional methods for bonding an end cap to a filter cap with chemical adhesives or potting compounds may prove inappropriate in high temperature or high vibration environments. For example, it has been found that seals achieved when a metal end cap is bonded to a filter pack comprising a polymeric or ceramic medium with chemical adhesives or potting compounds may fail when exposed to a high degree of mechanical vibration and/or high temperature. Furthermore, extensive surface preparation and primers are needed to achieve a successful bond between the filter pack and the end caps. With certain potting compounds, for example silicones or urethanes, even roughening the surface of metal end caps by sandblasting is not satisfactory for situations involving significant vibration.

There is a need for an improved method of forming filter assemblies having seals capable of withstanding high temperature and mechanical vibration. Additionally there is a need for a method of making inexpensive metal or ceramic end caps, especially suited for bonding to polymeric, ceramic or metallic filter packs.

There is also a need for improved filter assemblies having a robust seal between metal or ceramic end caps and a polymeric filter pack.

SUMMARY OF THE INVENTION

Accordingly, the present invention provides a method of forming a filter assembly comprising fixing a porous layer to an end cap and bonding the porous layer of the end cap to a filter pack with a potting compound. The potting compound flows into the pores and down, around and under the particles which form the porous layer of the end cap, thereby interlocking with this layer when set. Thus, in accordance with one aspect of this invention, an improved method for forming a filter assembly, where metal or ceramic end caps are sealed to a polymeric filter pack is provided. The filter assemblies made in accordance with the present invention exhibit robust seals between the end cap and the filter pack that withstand high temperatures and mechanical vibration.

The present invention also provides a method of making an end cap for bonding to a filter pack comprising fixing a porous layer to a region of an end cap which is arranged to receive the filter pack. The end caps made in accordance with this method may be assembled in advance and set aside until needed for bonding to a filter pack. Thus, in another aspect of this invention, a method of making an inexpensive metal or ceramic end cap suitable for bonding to a polymeric filter pack is provided.

The present invention further provides a filter assembly comprising a filter pack; an end cap having a porous layer; and a potting material applied to the porous layer to bond the end cap to the filter pack. In accordance with this aspect of the invention, the potting compound, upon setting, becomes anchored to the end cap. The seal between the end cap and the filter pack is exceptionally robust, capable of withstanding high temperatures and mechanical vibration.

BRIEF DESCRIPTION OF THE DRAWINGS

FIG. 1 is a sectional view of a filter assembly showing a filter pack bonded to an end cap.

FIG. 2 is an enlarged view of a portion of the filter assembly shown in FIG. 1.

SPECIFIC DESCRIPTION OF THE INVENTION

The present invention is directed to a method of making a filter assembly by fixing a porous layer to an end cap and bonding the porous layer to a filter pack with a potting compound. The invention also provides a filter assembly comprising an end cap bonded to a filter pack. Generally, in accordance with the method aspects of the invention, the filter pack is firmly located next to the end cap, such as by placing the filter pack in direct or indirect contact with a surface of the end cap. The filter pack and end cap are brought into contact with a potting compound to form a filter assembly. A robust bond is formed between the filter pack and the end cap.

An example of a filter assembly embodying the present invention is shown in FIG. 1. The filter assembly generally comprises a filter pack 4 bonded to an end cap 1. In accordance with one aspect of the invention, a porous layer 2 is fixed to the end cap 1 and an end of the filter pack 4 is bonded to the porous layer 2 by a potting compound 3. The seal that is formed is fluid tight, thereby preventing bypass of the process fluid.

The filter pack may be variously configured, and a variety of filter pack configurations are well known in the art. For example, tubular filter packs may include a corrugated filtration medium, support and drainage layers, a core, and a cage or wrap. Examples of commercially available filter packs include corrugated nylon membrane filters available from Pall Corporation under the trademark ULTIPOR®; corrugated sintered metal membrane filters available from Pall Corporation under the trademark, PMM®; and metal fiber filters available from Pall Corporation under the trademark, FIBERMESH®.

The various components of the filter pack may comprise a variety of materials, e.g., polymers, metals, ceramics, glass, and papers. For purposes of the present invention filter packs comprising corrugated filtration medium, a core and cage, and a support and drainage layer are preferred. An example of a filter pack useful in the present invention can be seen in PCT publication WO 94/11082.

One example of a method for making a filter assembly in accordance with the present invention comprises two basic steps. First, a particulate layer of metal or ceramic is bonded to an end cap, forming a porous layer. Second, the porous layer is bonded to a filter pack with a potting material. The potting material flows into the pores and down, around and under the particles which form the porous layer, so that when the potting material sets, a strong mechanical bond between the end cap and the filter pack is achieved.

The seal between a filter pack and an end cap of the present invention is capable of withstanding extremes in pressure, temperature and vibration, i.e., up to the limit of the potting material used.

End caps in accordance with the present invention may comprise any metal, metal alloy or ceramic. The type of material chosen is determined by cost, ease of manufacture and compatibility with the process fluid and process fluid environment. Examples of ceramic materials useful in the present invention include alumina, zirconia, mullite, and magnesium zirconate. Especially useful are those ceramic materials that lend themselves to being plasma or flame sprayed. Examples of metals and metal alloys that may be useful include, aluminum, copper, iron, manganese, molybdenum, nickel, zinc, bronze, pewter, and various forms of steel and steel alloys such as stainless steel. Stainless steel end caps are preferred. End caps comprising stainless steel can be readily and inexpensively produced, and they are compatible with a wide array of process fluids.

End caps of the present invention may be of any shape and size. The end caps may be circular, rectangular, ovoid, or any other shape. Typically, end caps in accordance with the present invention will conform in shape to the shape of the filter pack they are to seal. The size of end caps of the present invention are likewise determined by the filter pack to which they are to be sealed. For example, the end cap 1 shown in FIG. 1 comprises a disk shaped piece with raised sides, sized to receive the filter pack 4.

End caps in accordance with the present invention can be open or blind. An open end cap may be in the form of an annulus. When sealed to a filter pack, an open end cap may define a bypass-proof passage to either an inlet or outlet for the filter pack. A blind or closed end cap may be in the form of a disc. The exemplary filter assembly in FIG. 1. shows a blind end cap 1. When sealed to a filter pack, a blind end cap defines the closed end of a filter pack.

The method of the present invention is especially useful for sealing metal end caps to polymeric, ceramic or metallic filter packs. For example, metal end caps in accordance with the present invention can be used to form a fluid tight seal with tubular corrugated metal, ceramic or polymeric filter medium.

In preparing an end cap for use in the present invention, the porous layer may be fixed to a region of the end cap that is adapted to receive the filter pack. For example, a porous metal or ceramic layer may be fixed to a region of a preformed end cap. The type of porous material chosen is determined by cost, ease of manufacture, compatibility with the process fluid and process fluid environment, and the ability to form a strong bond with the end cap in use. Examples of metals and metal alloys that may be useful in fixing a porous layer include, aluminum, copper, iron, manganese, molybdenum, nickel, zinc, bronze, pewter, and various forms of steel and steel alloys such as stainless steel. A porous metal layer comprising stainless steel is preferred. A porous stainless steel layer can be readily and inexpensively produced and is compatible with a wide array of process fluids. Examples of ceramic materials for fixing a porous layer may include alumina, zirconia, mullite, and magnesium zirconate.

The porous layer can be fixed to the end cap in a variety of ways. For instance, a layer of particulate metal or ceramic can be deposited onto the end cap and then brazed on, sinter bonded, or even resistance welded to the end cap. Alternatively, a preformed porous metal or porous ceramic sheet can be laid down on the end cap and then brazed on or sinter bonded to the end cap. In yet another embodiment of the invention, a particulate metal or ceramic can be flame sprayed onto the end cap, thereby forming a porous layer bonded to the end cap.

In the instances where a particulate metal layer is to be deposited and then brazed on or sinter bonded to the metal end cap, the deposition of the particulate metal layer may be achieved by several methods. The metal particulate may be in the form of a dry powder, which is deposited onto the end cap. Methods of powder deposition on metal are well known. Alternatively, the metal particulate may be in the form of a slurry, which is applied to the end cap then dried. Methods of slurry deposition of particulate metals are also well known. For example, a suspending liquid may be prepared by mixing deionized water with a binder such as polyacrylic acid, commercially available from B. F. Goodrich Chemicals Company, under the trade name CARBOPOL® 934. A binder serves to hold the metal particulate together after the slurry is applied to the end cap and dried. The resultant suspending liquid is then mixed with a particulate metal powder such as 316L stainless steel powder which is available from numerous sources, including Ametek Specialty Metals. The slurry is then applied to a metal end cap to a desired thickness. The end cap is then heated, for example by placing in a convection oven, to drive off the water. At this point the end cap is exposed to sinter bonding conditions in order to permanently bond the dry layer of metal powder to the end cap. The binder evaporates at this point, leaving behind a porous sintered layer permanently bonded to the end cap. The porous sinter-bonded layer is superior to prior attempts at bonding an end cap to a filter pack with potting compound.

In another embodiment of the present invention, it may be desirable to lay down a preformed porous metal sheet onto a metal end cap. This obviates the need for powder or slurry deposition. Sheets of porous metal are commercially available in a variety of pore size ranges as well as metal/alloy compositions. In one embodiment of the invention, a brazing compound would be applied to the metal end cap and then a porous metal sheet laid down. The end cap would then be subjected to a temperature that activates the brazing compound, forming a strong bond between the end cap and the porous metal sheet. Alternatively, a porous sheet could be laid down directly on an end cap and then subjected to a temperature that initiates the formation of sinter bonds between the sheet and the end cap. The porous metal sheet may also be bonded to the end cap by welding the sheet directly to the end cap by resistance spot welding or other welding techniques.

In yet another embodiment of the invention, a porous layer of particulate metal or particulate ceramic can be bonded directly to an end cap by flame spraying. For example, a particulate metal is introduced into a high temperature or plasma gas stream where it is propelled against an end cap at high velocity. A porous layer of metal can easily be built up onto an end cap in this manner. Flame spraying techniques are well known.

Whatever methods of deposition and bonding are utilized, it may be desirable to pre-treat the end cap to increase the adhesion of the porous layer to the end cap. For example, the region of the end cap to which the porous layer is to be attached may be treated by chemical etching processes or by a physical roughening process such as blasting with glass beads.

The depth of the porous layer, the size of the pores, and the size of the particles may vary. The potting compound interlocks with the porous layer, forming an extremely robust seal with, for example, a stainless steel end cap. This is a significant improvement over the prior art, in that potting materials such as silicon have been extremely difficult to adhere to stainless steel. Thus, for purposes of the present invention, a depth of one or more particles, where a powder has been used to form the layer, would be sufficient to create an interlocking network for the potting compound. For purposes of the present invention, porous layers may be anywhere from about two to about 20 particles deep. Preferred is a layer which is between three and ten particles deep. For purposes of the present invention the nominal particle size of the particulate may be anywhere from about 0.5 to about 100 micrometers. Preferred is a nominal particle size range from about 1 to about 50 micrometers. FIG. 2 shows an enlarged view of the porous layer 2 from FIG. 1. The particles 5 are preferably sinter-bonded creating a porous matrix 6. In the illustrated embodiment, the porous layer 2 is bonded to the end cap 1, and the filter pack 4 is bonded to the porous layer 2 by potting compound 3.

The pore size of the porous layer may vary depending on the viscosity of the potting compound to be used. When utilizing potting compounds one may prepare a layer having a larger pore size. For purposes of the present invention nominal geometric pore sizes may be anywhere from about one micron to about 1000 microns in diameter, preferably from about ten to about 100 microns.

After the porous layer is fixed to the end cap, the porous layer can be sealed to a filter pack with a potting material. Potting materials are well known in the art. Examples of potting materials that may be useful in the present invention include epoxies, urethanes, silicone rubbers, and nearly any thermoplastic or thermoset resin, e.g., PEEK, polyester, etc.

The choice of potting material will be determined by its compatibility with the process fluid environment, and the ability of the potting material to readily flow into the pores and down, around and under the particles which form the bonded porous layer, as shown, for example, in FIG. 2. The viscosity of a potting material can be altered, thereby increasing its ability to flow into a porous layer. One can alter the viscosity of potting materials by the addition of diluents. It is important that diluent is not used in such quantity as to affect either the mechanical strength of a seal formed by the potting material or its properties of chemical resistance. In the exemplary filter assembly shown in FIG. 1 a potting material 3 effects the bond between the porous layer of the end cap 2 and the filter pack 4.

It is preferable to achieve a balance between the pore size of the porous layer and the viscosity of the potting material that will yield a high integrity seal at low cost. It is possible, for instance, to choose a potting material with the appropriate process fluid compatibility that, due to its high viscosity, is not suitable for wicking into a porous surface. The addition of a judicious amount of diluent or surfactant may solve the problem, as long as it does not adversely affect the potting material. Where the viscosity is still too high, a porous layer having larger pores can be formed by the use of appropriately sized metal or ceramic particles, or by employing a preformed porous metal or porous ceramic sheet having the desired pore size characteristics. In such instances it is important that the pore size is not increased to the point that the set potting compound is no longer anchored into the porous layer.

While the invention is susceptible to various modifications and alternative forms, certain specific embodiments thereof are described in the examples set forth below. It should be understood, however, that these examples are offered by way of illustration and not by way of limitation.

EXAMPLES

A binder mixture for a metal powder slurry was prepared, by mixing 213 grams of CARBOPOL® 934 with 16 liters of deionized water. The resultant suspending liquid had a viscosity of approximately 500 centipoise.

An austenitic steel powder slurry was prepared by adding one part, by weight, of 10 micron 316L stainless steel powder to two parts of the suspension liquid. The slurry was deposited on a 316L stainless steel circular end cap on the region designated to receive a filter pack to a thickness of about 0.06 inches.

The end cap was placed in a convection oven at 180° C. for four hours to drive off the water.

The end cap was placed in an $H_2$ atmosphere retort-type furnace at about 1900° C. for about 0.5 hours, in order to permanently sinter-bond the dry layer of metal powder to the end cap, forming a porous layer.

One end of a pleated, cylindrical ceramic fiber filter element, comprising fine quartz fibers, and a woven stainless steel mesh support and drainage layer (42×42 wires per inch with a wire diameter of 0.0055 inch), commercially available from Pall Corporation under the trade name TISSUEQUARTZ™, was placed on the portion of the end cap with the sinter-bonded porous layer. After assuring that the filter element was properly seated and centered on the end cap, a potting material comprising a high temperature two-part silicone resin was placed into the end cap to a level of 3/16 inches above the sinter bonded porous layer. The potting material was allowed to wick into the porous layer and cure.

EXAMPLE 2

A porous stainless steel layer was bonded to a stainless steel endcap according to the method described above in Example 1. A pleated cylindrical fiber metal element, available commercially from Pall Corporation under the trade name PMF®, was set into the end cap. The end cap had previously been filled to a depth of ⅛ inch with a two-part fire-retardant urethane resin, commercially available from Hardman Adhesives under the trade name KALEX™. The assembly was then placed in a bell jar, which was evacuated to remove entrained air, and allowed to cure slowly overnight to ensure adequate wicking into the porous layer. The assembly was then heated in a convection oven at 180° F. for eight hours to complete the curing.

While the invention has been described in some detail by way of illustration and example, it should be understood that the invention is susceptible to various modifications and alternative forms, and is not restricted to the specific embodiments set forth in the Examples. It should be understood that these specific embodiments are not intended to limit the invention but, on the contrary, the intention is to cover all modifications, equivalents, and alternatives falling within the spirit and scope of the invention.

What is claimed is:

1. A method of making a filter assembly comprising the steps of:
   (a) depositing a particulate material on an end cap;
   (b) sintering the particulate material to thereby form a porous layer fixed to the end cap; and
   (c) sealing the porous layer to a filter pack with a potting material thereby forming a filter assembly.

2. The method of claim 1 wherein depositing a particulate material on the end cap includes depositing the particulate material by powder deposition.

3. The method of claim 1 wherein the particulate material comprises a metal.

4. The method of claim 1 wherein the particulate material comprises a ceramic.

5. The method of claim 1 wherein depositing a particulate material on the end cap includes depositing the particulate material by slurry deposition.

6. The method of claim 1 wherein sealing the end cap to the filter element includes introducing a potting material between the end cap and the filter pack and curing the potting material.

7. The method of claim 1 wherein the step of sealing the porous layer to a filter pack comprises sealing the porous layer to the filter pack with a potting compound including at least one of an epoxy, urethane, silicone, rubber, or polyester.

8. The method of claim 1 wherein the step of sealing the porous layer to a filter pack comprises sealing the porous layer to the filter pack with a potting compound including at least one of a thermoplastic or thermosetting resin.

9. The method of claim 1 wherein the step of sealing the porous layer to a filter pack comprises fixing a porous layer to a polymeric filter pack.

10. The method of claim 9 wherein the end cap comprises a metal.

11. The method of claim 9 wherein the end cap comprises a ceramic.

12. The method of claim 1 wherein the, particulate layer is metal or ceramic.

13. The method of claim 12 wherein the step of sintering includes sintering the particulate metal or ceramic at an elevated temperature, and thereafter cooling the end cap and fixed particulates prior to sealing the porous layer to the filter pack.

14. The method of claim 1 wherein the step of sealing the porous layer to a filter pack includes sealing the porous layer to a tubular filter pack including a corrugated filtration medium.

15. The method of claim 14 wherein the tubular filter pack includes at least one support and drainage layer.

16. The method of claim 14 wherein the tubular filter pack comprises glass.

17. The method of claim 1 wherein the step of sealing the porous layer to a filter pack with a potting material includes sealing the porous layer to a glass filter pack.

18. The method of claim 1 wherein the particulate material comprises stainless steel.

19. The method of claim 1 wherein the porous layer is from about 2 to about 20 particles deep.

20. The method of claim 1 wherein the porous layer is between 3 and 10 particles deep.

21. The method of claim 1 wherein the particulate material has a particle size in the range from about 0.5 to about 100 microns.

22. The method of claim 1 wherein the particulate material has a particle size in the range of from about 1 to about 50 microns.

23. The method of claim 1 wherein the thickness of the sintered porous layer of step (b) is from about 2 to about 20 particles in depth and comprises particles having a nominal particle size of from about 1 to about 50 micrometers, and wherein the step of sealing the porous layer to the filter pack comprises sealing the porous layer to a corrugated filtration medium with a silicone potting material.

24. A filter assembly comprising: a filter pack; an end cap having a region which is arranged to receive the filter pack, a porous layer comprising a sintered material fixed to the region; and a potting material applied to the porous layer to seal the end cap to the filter pack.

25. The filter assembly of claim 24 wherein the sintered material comprises a metal.

26. The filter assembly of claim 24 wherein the sintered material comprises a ceramic.

27. The filter assembly of claim 24 wherein the filter pack comprises a polymeric material.

28. The filter assembly of claim 24 wherein the potting material includes at least one of an epoxy, urethane, silicone, rubber or polyester.

29. The filter of claim 24 wherein the potting material includes at least one of a thermoplastic or thermosetting resin.

30. The filter assembly of claim 24 wherein the filter pack comprises a tubular filter pack including a corrugated filtration medium.

31. The filter assembly of claim 30 wherein the filter pack includes at least one support and drainage layer.

32. The filter assembly of claim 30 wherein the filter pack comprises glass.

33. The filter assembly of claim 24 wherein the filter pack comprises glass.

34. The filter assembly of claim 24 wherein the particulate material comprises stainless steel.

35. The filter assembly of claim 24 wherein the porous layer is from about 2 to about 20 particles deep.

36. The filter assembly of claim 24 wherein the porous layer is between 3 and 10 particles deep.

37. The filter assembly of claim 24 wherein the nominal particle size of the particulate material is from about 0.5 to about 100 microns.

38. The filter assembly of claim 24 wherein the nominal particle size of the particulate material is from about 1 to about 50 microns.

39. The filter assembly of claim 24 wherein the thickness of the porous layer is from about 2 to about 20 particles in depth; wherein the filter pack comprises a corrugated filtration medium; wherein the porous layer is formed from particles having a nominal particle size of from about 1 to about 50 micrometers; and wherein the potting material comprises silicone.

40. A filter assembly comprising a filter pack, an end cap having a region arranged to receive the filter pack, a pre-formed porous sheet brazed or welded to the region; and a potting material applied to the porous layer to seal the end cap to the filter pack.

41. The filter assembly of claim 40 wherein the filter pack comprises a corrugated filtration medium.

42. The filter assembly of claim 40 wherein the pre-formed porous sheet is formed from particles having a nominal particle size of from about 0.5 to about 100 micrometers.

43. The filter assembly of claim 40 wherein the pre-formed porous sheet is formed from particles having a nominal particle size of from about 1 to about 50 micrometers.

44. The filter assembly of claim 40 wherein the thickness of the pre-formed porous sheet is from about 2 to about 20 particles in depth.

45. The filter assembly of claim 40 wherein the thickness of the pre-formed porous sheet is from about 3 to about 10 particles in depth.

46. A method of making a filter assembly comprising: fixing a porous layer to an end cap by flame spraying a particulate material onto the end cap; and sealing the porous layer to a polymeric filter pack with a potting material.

47. A method of making a filter assembly comprising brazing or welding a pre-formed porous sheet of material to an end cap, and sealing the porous layer to a filter pack with a potting compound.

48. The method of claim 47 wherein the step of brazing or welding a pre-formed porous sheet comprises brazing or welding a pre-formed porous sintered sheet.

49. A filter assembly comprising: a filter pack; an end cap having a region which is arranged to receive the filter pack, a porous layer comprising a flame sprayed particulate material fixed to the region; and a potting material applied to the porous layer to seal the end cap to the filter pack.

* * * * *